United States Patent [19]
Soper et al.

[11] Patent Number: 6,106,875
[45] Date of Patent: Aug. 22, 2000

[54] METHOD OF ENCAPSULATING FLAVORS AND FRAGRANCES BY CONTROLLED WATER TRANSPORT INTO MICROCAPSULES

[75] Inventors: Jon C. Soper, Lebanon; Xiaogen Yang, West Chester; David B. Josephson, Lebanon, all of Ohio

[73] Assignee: Givaudan Roure (International) SA, Switzerland

[21] Appl. No.: 09/351,213

[22] Filed: Jul. 12, 1999

Related U.S. Application Data

[63] Continuation-in-part of application No. 08/947,694, Oct. 9, 1997.

[51] Int. Cl.$^7$ ........................................................ A23L 1/22
[52] U.S. Cl. ........................... 426/89; 426/98; 426/534; 426/650
[58] Field of Search ................................ 426/89, 98, 534, 426/650; 424/457

[56] References Cited

U.S. PATENT DOCUMENTS

| | | | |
|---|---|---|---|
| 2,800,457 | 7/1957 | Green et al. | 252/316 |
| 2,800,458 | 7/1957 | Green | 252/316 |
| 3,516,943 | 6/1970 | Brynko et al. | 252/316 |
| 4,182,778 | 1/1980 | Hall et al. | 426/72 |
| 4,515,769 | 5/1985 | Merritt et al. | 424/49 |
| 4,588,612 | 5/1986 | Perkins et al. | 427/213 |
| 4,652,441 | 3/1987 | Okada et al. | 424/19 |
| 4,711,782 | 12/1987 | Okada et al. | 424/455 |
| 4,917,893 | 4/1990 | Okada et al. | 424/423 |
| 5,061,492 | 10/1991 | Okada et al. | 424/423 |
| 5,271,945 | 12/1993 | Yoshioka et al. | 424/489 |
| 5,332,595 | 7/1994 | Gaonkar | 426/602 |
| 5,370,881 | 12/1994 | Fuisz | 426/5 |
| 5,434,069 | 7/1995 | Tsaur et al. | 435/188 |
| 5,441,660 | 8/1995 | Tsaur et al. | 252/95 |
| 5,456,985 | 10/1995 | Zgoulli et al. | 428/402.2 |
| 5,460,817 | 10/1995 | Langley et al. | 424/408 |
| 5,492,646 | 2/1996 | Langley et al. | 252/174 |
| 5,500,228 | 3/1996 | Lawter et al. | 424/486 |
| 5,543,162 | 8/1996 | Timonen | 426/89 |
| 5,575,987 | 11/1996 | Kamei et al. | 424/451 |
| 5,607,708 | 3/1997 | Fraser et al. | 426/96 |
| 5,631,020 | 5/1997 | Okada et al. | 424/451 |
| 5,631,021 | 5/1997 | Okada et al. | 424/451 |

FOREIGN PATENT DOCUMENTS

| | | |
|---|---|---|
| 0782883 | 7/1997 | European Pat. Off. . |
| 5-292899 | 11/1993 | Japan . |

*Primary Examiner*—Nina Bhat
*Attorney, Agent, or Firm*—Wood, Herron & Evans, L.L.P.

[57] ABSTRACT

A method of encapsulating an amphiphilic volatile flavor or fragrance compound into a microcapsule having a hydrogel shell and an oil core. The flavor or fragrance compound in a fluid is transported into and solubilized in the core by partition coefficient equilibrium using water in the capsule wall to transport the compound into the core. Microcapsules made by the method of the invention may have a wall thickness and contain a high concentration of the flavor or fragrance compound that has not previously been feasible.

39 Claims, No Drawings

METHOD OF ENCAPSULATING FLAVORS AND FRAGRANCES BY CONTROLLED WATER TRANSPORT INTO MICROCAPSULES

RELATED APPLICATIONS

This application is a Continuation-In-Part application of U.S. application Ser. No. 08/947,694 filed Oct. 9, 1997, now pending.

FIELD OF THE INVENTION

This invention relates to a method of encapsulating flavors or fragrances into microcapsules having a hydrogel shell and an oil core.

BACKGROUND OF THE INVENTION

Microcapsules incorporating a flavor or fragrance compound are useful to provide a controlled release of the contained flavor or fragrance. Such products may be used in the food processing industry, where encapsulated flavor particles may provide a flavor burst upon chewing the food or may allow taste evaluation of a botanical or food/beverage aroma. Such products may also be used in the cosmetic and toiletry industries, where encapsulated fragrance particles may provide a burst of scent upon capsule fracture. The capsule may comprise a shell surrounding a core material in which the flavor or fragrance compound is contained.

Microcapsules may be formed by a coacervation or crosslinking process, in which lipids are coated by tiny droplets of proteins, carbohydrates, or synthetic polymers suspended in water. The process of coacervation is, however, difficult to control and depends on variables such as temperature, pH, agitation of the materials, and the inherent variability introduced by a natural protein or carbohydrate.

In the manufacture of microcapsules containing a flavor or fragrance compound, several features are desirable. It is desirable to produce microcapsules that have strong walls and that do not agglomerate. It is desirable that the compound be readily loaded into an oil microparticle, that is, be readily absorbed into the oil core of the microcapsule. Once absorbed, it is also desirable that the compound be irreversibly retained in the oil core of the microcapsule, that is, be adsorbed into the microcapsule.

The amount of compound that may be encapsulated depends upon several factors including its solubility in a fluid such as a gas or water, partition coefficient, molecular weight, water content, volatility, and the ratio of blank capsule to water amounts. Flavors and fragrances may be mixtures of hundreds of components, each of which may widely in these properties. A flavor or fragrance compound that is lipophilic may be readily contained in an oil core of a microcapsule, while a flavor or fragrance compound that is hydrophilic may be less readily contained in an oil core. For example, the flavor compound diacetyl (DA) is about 20% to about 30% water soluble. For diacetyl, typical maximum absorption into an oil is up to only about 55%. A highly water soluble compound such as diacetyl is also more difficult to retain in the oil core once it is loaded.

A compound's solubility in an aqueous phase versus an oil phase is determined by its partition coefficient, abbreviated as K. The partition coefficient of a compound is the ratio of the compound's concentration in one liquid phase to the compound's concentration in another liquid phase ($K_{liquid/liquid}$) or in one gaseous phase to another liquid phase ($K_{gas/liquid}$). The partition coefficient thus is an inherent property of the compound with two given liquid phases, such as a lipid phase and an aqueous phase, or a lipid and a gas phase, and reflects the compound's distribution at equilibrium between the water or gas phase and the lipid phase. Any means of decreasing the water solubility of a compound will shift the equilibrium of the compound and thus shift its partitioning between an aqueous or gas phase and a lipid phase. For example, addition of a salt will decrease the water solubility of a compound and will increase its partitioning into the lipid phase. Similarly, crosslinking a protein membrane to strengthen the membrane and physically decrease the amount of water, or physically removing water from the environment, causing capsule wall or membrane shrinking, will decrease the water solubility of a compound and will increase its partitioning into the oil phase.

Flavors or fragrances that are water soluble may interfere with encapsulation of an oil particle. For example, flavor or fragrance compounds that are water soluble cannot be encapsulated using gelatin coacervation. This is because for coacervation to occur, there must be a droplet to coat, and for these water soluble materials, there are no droplets to coat. In addition, the water soluble flavor or fragrance may partition so as to locate the flavor or fragrance compound in an aqueous environment outside the encapsulated oil particle rather than inside the oil particle. If a flavor or fragrance compound is too water soluble, the coacervation process ceases to function due to the colloid becoming either too thick or too thin. A colloid that is too thick has no flow, and thus cannot properly coat the oil surface. A colloid that is too thin is not retained on the oil surface. In the extreme, a water soluble flavor or fragrance compound can totally solubilize the colloid, leaving no wall material to deposit on the oil surface.

Besides water solubility, a flavor or fragrance compound that contains fatty acids affects the pH of a coacervation reaction. If a base is added in an attempt to adjust pH, the fatty salts produced in the reaction impart an undesirable soap taste to a flavor compound. If a flavor or fragrance compound contains water soluble esters, the coacervation temperature is affected and hence the final gelation temperature is altered. While it is therefore desirable to limit compounds that contain either fatty acids or water soluble esters, there is a tradeoff in the potency and profile results for the encapsulated compound. This limits the range of formulations that are able to be effectively encapsulated.

Currently, flavor or fragrance compounds that are difficult to encapsulate are diluted with oils such as vegetable oil or mineral oil. This alters its oil to water partition coefficient, in which the compound attempts to reach an equilibrium between the oil and aqueous phases. The oil serves to reduce the natural water solubility of most compounds and, in many cases, reduces it below the level at which it interferes with coacervation. A flavor or fragrance compound that is highly water soluble, however, does not have this effect. A compound that has a water solubility greater than 25% prefers to partition in an aqueous phase, and a ratio of lipid:water greater than 90% is needed to encapsulate these compounds. The coacervation process, however, is generally limited to about 22% lipid. Thus, this technique is of only limited applicability for water soluble flavor or fragrance compounds.

Several techniques are known in the art for absorbing compounds into a microcapsule, such as cyclodextrin entrapment or silica plating. A drawback of the cyclodextrin entrapment technique is that the binding effect varies widely depending upon the particular flavor or fragrance compound. A drawback of the silica plating technique is that there is no barrier to protect the flavor or fragrance compound from evaporation. Thus, there is a need for an efficient method of absorbing the many types of flavor and fragrance compounds to the desired level of loading in an encapsulated oil. There is also a need for an efficient method of adsorbing flavor and fragrance compounds once they have been encapsulated.

SUMMARY OF THE INVENTION

This invention relates to a method of encapsulating a flavor or fragrance compound by controlled water transport of the compound into a capsule having an oil core. The method comprises preparing a microcapsule having a hydrogel shell and an oil core, and thereafter adding an amphiphilic flavor or fragrance compound in a liquid or gaseous state in the presence of water to the microcapsule to transport the compound through the hydrogel shell and into the oil core. The compound is transported into the core by aqueous diffusion through the hydrogel shell. The oil core is retained in the hydrogel shell during the aqueous diffusion. A flavor or fragrance compound is thus encapsulated in the hydrogel shell containing the retained oil core.

The shell may consist of a carbohydrate or a protein, which may be crosslinked or non-crosslinked, or a synthetic polymer such as polyvinyl pyrollidone or methyl cellulose. The oil core may comprise, for example, vegetable oil, mineral oil, benzyl alcohol, or mixtures thereof. In a preferred embodiment, the oil is a short chain triglyceride of fractionated coconut oil. As more particularly defined hereinafter, "oil" is meant to include a wide range of substances that are dispersible in water due to their hydrophobic nature.

In an alternative embodiment of the invention, the microcapsule may be prepared in a dry form. An amphiphilic volatile flavor or fragrance compound is added, in the presence of a controlled volume of water, to a substantially dry microcapsule having a hydrogel shell surrounding an oil core. The compound is solubilized in a fluid, either a liquid or gas, is transported through the hydrogel shell by aqueous diffusion into the oil core and is retained in the core. The microcapsule having the flavor or fragrance compound retained in the oil core is used as is. Alternatively, the capsule wall may be treated to prevent loss of component and then dried.

In a preferred form of the invention, a flavor or fragrance compound is encapsulated by preparing a microcapsule of a coacervate of an oil core and a hydrogel shell, adding the flavor or fragrance compound in the presence of water to the microcapsule for transportation of the compound into the oil core, transporting the compound through the hydrogel shell by aqueous diffusion, and retaining the oil core in the hydrogel shell during the transportation to provide the encapsulated flavor or fragrance and retained oil core in the hydrogel shell.

The invention is also directed to a method of encapsulating a volatile flavor or fragrance compound by preparing a microcapsule having a hydrogel shell surrounding an oil core for retention of the oil in the shell, adding the compound in its gaseous state in the presence of water to the microcapsule for transportation of the compound into the retained oil core, transporting the compound by aqueous diffusion through the hydrogel shell into the retained oil core, and retaining the oil core in the hydrogel shell during said transportation to provide the encapsulated compound in the hydrogel shell containing the retained oil core. The compound, such as an aroma chemical, is in a stream of a gas such as air, carbon dioxide, nitrogen and/or argon that is passed over the microcapsule.

The invention is additionally directed to a method of encapsulating a volatilized compound by capturing the volatilized compound in a gas stream and passing the gas stream containing the volatilized compound in the presence of water over microcapsules having a hydrogel shell surrounding an oil core for retention of the oil in the shell for transporting the volatilized compound into the microcapsule retained oil core, and retaining the oil core in the hydrogel shell during transport to provide the encapsulated volatile compound in the hydrogel shell containing the retained oil core.

The invention is also directed to the products produced by the methods of the invention.

One advantage of the invention is that the microcapsule may contain a concentration of the flavor or fragrance compound in either a liquid or gaseous state, that heretofore has not been feasible. A second advantage is that the walls of the blank microcapsules have a substantially uniform thickness, strength, and resiliency. Another advantage is the increased yield of encapsulated flavor or fragrance, since essentially no flavor or fragrance compound is lost to the environment. Still another advantage is the economy in manufacturing the flavor or fragrance compounds of the invention, since the same technology is used for all flavors and fragrances. Yet another advantage is that the encapsulated material is edible, allowing direct tasting without further chemical modification.

The objectives and other advantages of this invention will be further understood with reference to the following detailed description and examples.

DETAILED DESCRIPTION

In a preferred practice of the invention, microcapsules containing a desired flavor or fragrance compound are formed by a coacervation process. In coacervation, there is separation of a colloid into a colloid-rich phase (the coacervate) and an aqueous solution of the coacervating agent (the equilibrium liquid), forming an oil coated with protein, carbohydrate, or polymeric droplets so as to suspend the oil in water. In the process, two lipid phases and one aqueous phase are ultimately absorbed into one lipid phase and one aqueous phase. The first lipid phase forms the microcapsule core. The core is surrounded by a hydrogel capsule, defined herein as a colloid in which the dispersed phase (colloid) has combined with the continuous phase (water) to produce a viscous jellylike product. The core consists of an oil which is a term used herein to define a wide range of substances that are quite different in their chemical nature. Oils may be classified by their type and function and encompass mineral oils (petroleum or petroleum-derived), vegetable oils (chiefly from seeds and nuts), animal oils (usually occurring as fats; the liquid types include fish oils), essential oils (complex volatile liquids derived from flowers, stems, leaves, and often the entire plant), and edible oils (chiefly vegetable oils as well as some special fish oils). Oils derived from living organisms are chemically identical with fats, the only difference being one of consistency at room temperature. In one embodiment, the oil may be mineral oil, vegetable oil, or benzyl alcohol. In a preferred embodiment, the oil is a short chain triglyceride of fractionated coconut oil, available under the trade names Migylol® (Huls Corp., Piscataway, N.J.) or Captex® (Abitec Corp., Janesville, Wis.). The hydrogel shell may be either carbohydrate, protein, or a synthetic polymer such as polyvinyl pyrollidone or methyl cellulose. In a preferred embodiment, the oil is Migylol® or Captex® and the shell is gelatin. The second lipid phase is the desired flavor or fragrance compound, which is to some extent both water-soluble and lipid-soluble, that is, it is amphiphilic, which is the term used herein to define its dual solubility properties. The aqueous phase is used to transport, by partition coefficient equilibrium, the slightly water soluble flavor or fragrance compound into the oil core of the microcapsule by aqueous diffusion. Equilibrium dynamics continue until the three phases (two lipid and one aqueous) are absorbed into two phases (one lipid and one aqueous).

Volatile chemicals such as aroma flavor or fragrance chemicals may be encapsulated by head space partitioning. This may be useful, for example, in taste evaluation of a botanical material or food/beverage aroma, since the perception by smell and by taste may be very different. Microcapsules containing an absorbed aroma chemical prepared according to the invention can be tasted directly or can be dissolved in water or another solvent and then tasted. Microcapsules provide an effective absorbent for an aroma chemical and a sanitary and safe medium for sensory evaluation. Examples of aroma chemicals include but are not limited to dimethyl sulfide, acetic acid, furfuryl, mercaptan and ethylbutyrate.

Encapsulation is achieved by passing a gaseous stream containing the aroma compound through a chamber containing the sorption capsule material in the form of microcapsules, prepared as previously described, in the presence of water. The gas is preferably air for economic reasons, but other gases such as nitrogen, carbon dioxide or argon may be used. The microcapsules may contain as little as about 0.5% to 1% water when a highly water soluble aroma or flavor such as acetic acid is to be encapsulated. More preferably, about 5% to about 10% of moisture may be added to microcapsules to activate them to conduct the transportation of the volatilized flavor or fragrance by aqueous diffusion through the hydrogel shell. The moisture to conduct aqueous diffusion may be present in the microcapsules and/or may be in the gas stream passing over the microcapsules, for example, by adjusting to a relative humidity of between about 40–80%. Transport of the compound may occur at temperatures from 0° C.–100° C., but usually will occur at temperatures in the range of about 20° C.–25° C. and under atmospheric conditions. In one embodiment, the sorption capsule material is gelatin coacervated migylol.

The compound is transported through the hydrogel shell by aqueous diffusion into the oil core and is retained in the core. The microcapsules having the aroma flavor or fragrance compound retained in the oil core may be used as is. In another embodiment, the capsule wall may be rendered less susceptible to leakage of the retained components. This may be accomplished by drawing off moisture from the hydrogel shell with salts such as sodium chloride, sodium sulfate, sodium citrate, etc. or other dehydrating agents. The amount of the salt used is from about 5% to about 95% by weight of the capsules, depending upon the amount of moisture to be captured or drawn away from the shell. The microcapsules containing the retained flavor or fragrance may be air dried.

Blank microcapsules are added to a chamber that is configured to capture the aroma compounds by way of controlled water transport into the capsule having an oil core. The chamber may be of any size and of any material, for example, glass, plastic, stainless steel or other material to contain the microcapsules and allow passage of a gaseous stream. In one embodiment, microcapsules are packed into a glass tube and the ends of the tube are covered by a metal or other type of screen, allowing access of the gaseous stream containing the volatilized compound to the microcapsules contained therein. In another embodiment, two 55 gallon stainless steel tanks contain microcapsules and are connected to a gaseous stream.

The chamber may be connected either directly or indirectly to a gas source that captures the desired aroma chemical in the gaseous stream. The source of the aroma chemical, which may be in any physical form, is placed in a container of any size and composition connected to the gas source. Standard types of connectors are used such as plastic, glass or stainless steel tubing. The aroma chemical in the headspace of the container is captured by the flowing gas and is then provided to the chamber containing the microcapsules, again using any type of standard connector. The gaseous stream containing the aroma chemical is passed over the microcapsules using either positive (e.g., pumping) or negative (e.g., vacuum) pressure. In one embodiment, the gaseous stream may be recirculated. The time during which the aroma chemical is encapsulated can vary but is typically from about 0.5–5 h. This time depends upon factors such as the aroma intensity of the sample and the aroma notes of interest, for example, total aroma, top notes, bottom notes or in between.

The gas source may be an air stream pump. The chamber may be connected to a waste air duct for treatment of the waste air stream, such as an air stream pumping over coffee grounds. The chamber may be connected to an air source from a food processing operation, for example, to capture desired natural flavor aroma chemicals such as natural tomato essences of tomato stewing operations. The chamber may be connected to an air source from a vessel containing chemicals dissolved in a low volatile oil for the purpose of extracting the volatile chemicals without heat or distillation. The chamber may be connected to a sample cell to capture flavor aroma chemicals contained in vegetable matter, for example, as an oily mash or an aqueous extract for the purpose of capturing only the aroma chemicals and none of the waxes or bitter chemicals. The chamber may be connected to a fermentation broth or a solution of an organic reaction for the continuous removal and capture of aroma chemicals.

After exposure of the microcapsules to the aroma chemical in the gaseous stream, the ends of the tube may be capped or otherwise sealed, for example, by inserting Teflon or other types of plugs into both ends of the tube or by other means. This embodiment is useful when aroma trapping is performed in the field where microcapsule analysis is delayed, versus where aroma trapping is performed in a laboratory where microcapsule analysis occurs soon after exposure.

The volatile chemicals in a gaseous state exhibit partitioning migration through the wall of the microcapsule and deposit in the oil core in the same manner as do the chemicals in a liquid state, the difference being the use of a gas phase transfer rather than a liquid phase transfer. Uses of this embodiment include, but are not limited to, direct microencapsulation of volatile chemical components, waste air stream treatment, selective encapsulation of volatile aroma components from a nonvolatile solvent, and capture of airborne organic compounds for analytical analysis. The method may be used to capture flavor aroma chemicals in the field, or to capture important natural flavor aroma chemicals from waste air streams of commercial processes. Examples include the capture of beer or wine flavors from the manufacturing waste air stream, capture of coffee or nut flavors from roasting operations, capture of cereal notes from cereal manufacturing, capture of fried notes from doughnut, fried snacks or french fry operations, and capture of orange essences from orange oil.

For some water soluble compounds, less water is required for absorption or partitioning into the oil phase. Conversely, for some highly lipid soluble compounds, more water may be required for partitioning into the oil phase. Thus, by transiently varying the amount of water that is available to a compound, taking into account the compound's partition coefficient in either a gaseous or liquid state, a compound may be absorbed through the hydrogel shell into an oil.

Adsorption of the compound in the oil can be controlled. Dehydration of the microcapsule or crosslinking of the capsule shell locks the flavor or fragrance compound inside the microcapsule. In dehydration, a substantial volume of the water is removed from the capsule, thereby reducing the loss of the partially water-soluble flavor or fragrance compound from the oil core into an aqueous environment. Alternatively, crosslinking of the hydrogel shell of the coacervate renders the encapsulated oil thermostable, since a capsule containing crosslinks is a stable structure. The use of known chemical crosslinking agents, such as formaldehyde or glutaraldehyde, to irreversibly crosslink the oil-containing capsule is known. Other crosslinking agents such as tannic acid (tannin) or potassium aluminum sulfate (alum) are similarly known. An optional capsule hardening step, as disclosed in U.S. Pat. Nos. 2,800,457 and 2,800,458, consists of adjusting a suspension of capsular material to pH 9 to 11, cooling to 0° C. to 5° C., and adding formaldehyde. Formaldehyde and glutaraldehyde are also effective chemical crosslinking agents. For the food industry and the cosmetic/toiletry industries, suitable cross-linking agents may be selected depending upon the specific application.

Certain naturally-occurring enzymes are also good crosslinking agents. Crosslinking using enzymes, such as transglutaminase, is disclosed in co-pending application Ser. No. 08/791,953 entitled Enzymatically Protein-Encapsulating Oil Particles by Complex Coacervation, which is hereby incorporated by reference in its entirety. Enzymes work by catalyzing the formation of bonds between certain amino acid side chains in proteins. In addition, because the enzymes are naturally occurring, encapsulated oils that are enzymatically crosslinked do not suffer from the problems inherent with formaldehyde and glutaraldehyde crosslinking, and hence may be ingested or applied without the concern of toxicity of the crosslinking agent. Because crosslinking is a enzyme catalyzed reaction, however, the proper environmental conditions must exist for optimum enzyme activity.

For compounds with high water solubility, defined herein as at least about 20% water soluble, it is preferable to concentrate the microcapsule to 55% solids or to start with dry microcapsules and gravimetrically add water and compound to get the desired results. For compounds with low water solubility, defined herein as less than about 20% water soluble, a hydrated microcapsule preparation may be used.

EXAMPLE 1

Blank capsules that are hydrated are prepared by prewarming deionized water to 50° C.±2° C. A gum solution is prepared by vigorously agitating prewarmed deionized water (87.2018 g), carboxymethyl cellulose, sodium salt (1.8447 g), and gum arabic FCC powder SP Dri (0.1845 g). The solution is mixed until the solids are completely dissolved, then the solution is cooled to about 35° C. to about 40° C. A gelatin solution is prepared by vigorously agitating prewarmed deionized water (163.0453 g) and 250 Bloom type A gelatin (18.4461 g) in a preemulsion tank until the gelatin is completely dissolved, then the solution is cooled to about 35° C. to about 40° C. Without agitation, the gum solution is added to the gelatin solution in the preemulsion tank and the foam is allowed to dissipate for about 15–20 min. The pH is adjusted to about 5.5 with either a dilute sodium hydroxide solution (50% w/w) or a dilute citric acid solution (50% w/w).

Vegetable oil (180.02 g of Captex® 355 mixed triglycerides or Migylol®) is added with slow agitation, avoiding pooling of the oil. The capsule size is adjusted to about 100 microns to about 400 microns and the size is verified microscopically. The solution is slowly cooled at about 1° C. per 5 min until the solution reaches about 28° C. If the capsule walls are intact, as determined by microscopic examination of capsules showing uniform deposition of protein with no free protein floating in the water phase, the solution may be quickly cooled to about 10° C. If the capsule walls are thin, as determined by microscopic examination of capsules showing nonuniform deposition of protein and free protein floating in the water phase, the solution is reheated to about 32° C. to about 33° C. The solution is mixed at about 5° C. to about 10° C. for 1 h. The solution is then heated to about 15° C. to about 20° C. Fifty percent glutaraldehyde is added and allowed to mix for about 16 h. Agitation is then discontinued and the capsules are allowed to separate by flotation. Approximately 48% to 50% (approximately 379 lbs to 395 lbs) of water is drained from the bottom of the tank into a separate vessel. If capsules are present in the drained liquid, draining is stopped and agitation is begun to resuspend the separated capsules into solution. The separation step is then repeated. Once separation is complete, agitation is again begun in order to resuspend the capsules into solution. Sodium benzoate (10% w/w) is added with thorough mixing. If necessary, citric acid is added to adjust the pH to less than 4.0.

Blank capsules, defined herein as encapsulated oil with no flavor or fragrance value, that are dry are prepared by the following method. A syloid solution is prepared by mixing a silica compound syloid 244 grade 68 powder (15.9497 g) with deionized water (143.5477 g) until the powder is completely dispersed and no lumps are present. The flavor is mechanically mixed until smooth, then the syloid solution is mixed with the flavor until it is completely dispersed with no lumps, thinning out after about 30 min of stirring. The product is concentrated by centrifugation to about 50% or more solids. The material is then dried in either a vacuum oven dryer at about 80° C. or in a fluid bed dryer at about 70° C.

The dry crosslinked capsules (400 g) are placed in a stainless steel mixing bowl (Hobart Lab Scale Mixer). The desired neat flavor (428.6 g) is mixed with deionized water (171.4 g) on a magnetic stirrer for 5 min. The dry capsules are mixed with the water/flavor mixture on the Hobart Mixer at power level 1–2 for 5 min. The mixture is poured into a plastic storage container, using a rubber spatula to scrap the sides of the mixing bowl, and the container is closed. The mixture is allowed to incubate for 24 h for flavor absorption before the product is used.

EXAMPLE 2

Blank capsules that are hydrated are prepared by prewarming deionized water to 50° C.±2° C. A gum solution is prepared by vigorously agitating prewarmed deionized water (87.2018 g), carboxymethyl cellulose, sodium salt (1.8447 g), and gum arabic FCC powder SP Dri (0.1845 g). The solution is mixed until the solids are completely dissolved, then the solution is cooled to about 35° C. to about 40° C. A gelatin solution is prepared by vigorously agitating prewarmed deionized water (163.0453 g) and 250 Bloom type A gelatin (18.4461 g) in a preemulsion tank until the gelatin is completely dissolved, then the solution is cooled to about 35° C. to about 40° C. Without agitation, the gum solution is added to the gelatin solution in the preemulsion tank and the foam is allowed to dissipate for about 15–20 min. The pH is adjusted to about 5.5 with either a dilute sodium hydroxide solution (50% w/w) or a dilute citric acid solution (50% w/w).

Vegetable oil (180.02 g of Captex® 355 mixed triglycerides or Migylol®) is added with slow agitation, avoiding pooling of the oil. The capsule size is adjusted to about 100 microns to about 400 microns and the size is verified microscopically. The solution is slowly cooled at about 1° C. per 5 min until the solution reaches about 28° C. If the capsule walls are intact, as determined by microscopic examination of capsules showing uniform deposition of protein with no free protein floating in the water phase, the solution may be quickly cooled to about 10° C. If the capsule walls are thin, as determined by microscopic examination of the capsules showing nonuniform protein deposition and free protein in the water phase, the solution is reheated to about 32° C. to about 33° C. The solution is mixed at about 5° C. to about 10° C. for 16 h, then agitation is discontinued and the capsules are allowed to separate by flotation. Approximately 48% to 50% (approximately 379 lbs to 395 lbs) of water is drained from the bottom of the tank into a separate vessel. If capsules are present in the drained liquid, draining is stopped and agitation is begun to resuspend the separated capsules into solution. The separation step is then repeated. Once separation is complete, agitation is again begun in order to resuspend the capsules into solution. Sodium benzoate (10% w/w) is added with thorough mixing. If necessary, citric acid is added to adjust the pH to less than 4.0. The capsules are stored at about 5° C. to about 10° C.

The hydrated uncrosslinked beads (815.20 g) are added to a glass reactor at about 5° C. to about 10° C. Stirring at about 95–100 rpm is begun while maintaining the temperature at about 5° C. to about 10° C. Neat flavor or fragrance (181.8 g) is added to the glass reactor. The mixture is stirred for about 2 h at about 5° C. to about 10° C. to allow the flavor or fragrance to absorb into the capsules. Fifty percent glutaraldehyde (3.0 g) is then added and allowed to mix at about 15° C. to about 20° C. for 16 h. Sodium benzoate (10.25 g of a 10% solution) is added to the reactor. Citric acid (20%) is added to adjust the pH of the solution to 3.9. The capsules are stabilized by adding a well-mixed xanthan gum/propylene glycol mixture (1 part xanthan to 2 parts propylene glycol). The mixture is stirred for about 30 min until the capsules are stabilized. Once the capsules are stabilized, they are ready for use.

EXAMPLE 3

Blank microcapsules were packed into a glass absorption tube (3.5 mm I.D., 10 cm length) to be used as a "taste trap". The packing height of the absorbent usually ranged from about 1–5 cm (0.09–0.45 g microcapsules), depending upon the experimental objective. After packing, both open ends of the tube were plugged with metal screens. One end of the tube was connected HOW? to a glass cover or container holding the subject aroma chemical for analysis. The other end of the tube was connected by plastic tubing to an air sampling pump. The air flowrate was about 30 ml/min. The time during which the aroma chemical was trapped varied from about 0.5–5 h, depending upon the aroma intensity of the sample and the aroma notes of interest, for example, total aroma, top notes, bottom notes or in between.

When trapping was finished, the metal screens were removed and the aroma encapsulated microcapsules were evaluated by taste. When aroma trapping was performed in the field versus a laboratory type of environment, the end of the glass tubes were securely sealed by inserting Teflon plugs into both ends of the tubes before being transported to the laboratory for evaluation.

EXAMPLE 4

The technique described in Example 3 was successfully used to evaluate the aroma of the bark of *Scorodophloeus zenkeri* Huac. Fifty g of the bark of *Scorodophloeus zenkeri* Huac was obtained on the commercial market (Libreville, Gabon). A glass absorption tube was prepared with 0.27 g of blank microcapsules. The exposure time was 2 h with an air flow rate of 30 ml/min. Upon completion, the aroma encapsulated microcapsules were dissolved in water. The solution was described by trained evaluators as having the taste of onion spiced soup.

EXAMPLE 5

The technique described in Example 3 was successfully used to collect and concentrate volatile aromas from roasting operations such as from coffee, cereal or peanut processing.

EXAMPLE 6

The technique described in Example 3 was successfully used to collect and concentrate volatile aromas from frying operations such as in the manufacture of snack chips, doughnuts and meat.

EXAMPLE 7

The technique described in Example 3 was successfully used to collect and concentrate volatile aromas from baking operations such as in the manufacture of snack crackers, breads and cakes.

EXAMPLE 8

The technique described in Example 3 was successfully used to collect and concentrate volatile aromas from materials whereby volatile compounds are separated from non-volatile compounds, such as separation of chocolate essence from bitter chocolate and volatile beer topnotes from fermentation broths.

EXAMPLE 9

The technique described in Example 3 was successfully used to collect and concentrate volatile hydrophilic aromas components from materials whereby hydrophilic volatile components are separated from hydrophobic components, as in separation of oxygenated volatile components from limonin in orange and other citrus oils.

EXAMPLE 10

Sodium alginate (8.22 g, type FD 155, Grinsted Corp.) was dissolved in deionized water (300 g). The solution was stirred until homogeneous. Microcapsules (3.75 g) were added with stirring until a homogeneous phase formed. Migylol® (99.9 g) was then added with vigorous stirring to form an oil-in-water emulsion. The emulsion was fed through a vibrating needle (1.22 mm internal diameter) that was positioned about one inch above the lowest point of an eddy generated in a glass beaker by vigorous stirring of a 4% w/w aqueous $CaCl_2$ solution (150 ml). The flow rate of the emulsion through the needle was adjusted to prevent formation of a jet. Emulsion droplets, upon entering the $CaCl_2$ solution, immediately gelled, yielding particles of about 800 µm diameter. After the emulsion was added, the slurry of beads was permitted to stand for about 30 min to allow migration of calcium ions into the microcapsules. The microcapsules were dewatered at room temperature either by centrifugation or by vacuum filtration, and were subsequently dried by techniques known in the art such as vacuum oven drying or fluid bed drying.

The resulting microcapsules had a slight tendency to stick together due to the presence of some surface oil. A free-flowing, dry alginate-encapsulated flavor or fragrance compound was obtained by mixing the microcapsules (about 58%) and water (about 7%) with the desired flavor or fragrance compound (about 35%). The optimal absorption time is between about one hour and ten hours, depending upon the partition coefficient of the particular flavor or fragrance compound.

It should be understood that the embodiments of the present invention shown and described in the specification are only preferred embodiments of the inventors who are skilled in the art and are not limiting in any way. Therefore, various changes, modifications or alterations to these embodiments may be made or resorted to without departing from the spirit of the invention and the scope of the following claims.

What is claimed is:

1. A method of encapsulating a volatile flavor or fragrance compound comprising:
   preparing a microcapsule having a hydrogel shell surrounding an oil core for retention of the oil in the shell,
   adding the compound in its gaseous state in the presence of water to the microcapsule for transportation of the compound into the retained oil core,
   transporting the compound by aqueous diffusion through the hydrogel shell into the retained oil core, and
   retaining the oil core in the hydrogel shell during said transportation to provide the encapsulated compound in the hydrogel shell containing the retained oil core.

2. The method of claim 1 wherein the compound is added to a hydrated microcapsule.

3. The method of claim 1 wherein the compound is in a stream of a gas that is passed over the microcapsule.

4. The method of claim 3 wherein the gas is selected from the group consisting of air, carbon dioxide, nitrogen, argon and combinations thereof.

5. The method of claim 3 wherein the gas stream is humidified to about 40–80% relative humidity.

6. The method of claim 1 wherein the compound is an aroma chemical.

7. The method of claim 1 wherein a mixture of volatile compounds is added to the microcapsule.

8. The method of claim 1 wherein the compound is transported into the retained oil core at a temperature in the range of 20° C.–25° C. under atmospheric conditions.

9. The method of claim 1 wherein the shell is selected from the group consisting of a protein, a carbohydrate, and a synthetic polymer.

10. The method of claim 9 wherein the synthetic polymer is polyvinyl pyrollidone.

11. The method of claim 1 wherein the oil core is selected from the group consisting of a mineral oil, a vegetable oil, a benzyl alcohol, and mixtures thereof.

12. The method of claim 11 wherein the vegetable oil is a short chain triglyceride of fractionated coconut oil.

13. The method of claim 1 further comprising treating the shell to prevent removal of the compound from the microcapsule.

14. The method of claim 13 wherein the treating is by removing water from the shell.

15. The method of claim 14 wherein the removing water is by adding a salt.

16. The method of claim 13 wherein the treating is by adding a crosslinking agent.

17. The method of claim 16 wherein the crosslinking is performed before the compound is added to the microcapsule.

18. The method of claim 16 wherein the crosslinking is performed after the compound is added to the microcapsule.

19. The method of claim 1 wherein the microcapsule is prepared by coacervation of an oil core and a hydrogel shell.

20. The method of claim 1 wherein the microcapsule is gelatin coacervated migylol.

21. The product of the method of claim 1.

22. The product of the method of claim 5.

23. The product of the method of claim 9.

24. The product of the method of claim 11.

25. The product of the method of claim 20.

26. A method of encapsulating a volatilized compound comprising
   capturing said volatilized compound in a gas stream,
   passing the gas stream containing the volatilized compound in the presence of water over microcapsules having a hydrogel shell surrounding an oil core for retention of the oil in the shell for transporting the volatilized compound into the microcapsule retained oil core, and
   retaining the oil core in the hydrogel shell during the transporting to provide the encapsulated volatile compound in the hydrogel shell containing the retained oil core.

27. The method of claim 26 wherein said gas is selected from the group consisting of air, carbon dioxide, nitrogen, argon and combinations thereof.

28. The method of claim 24 wherein said volatilized compound is an aroma chemical.

29. The method of claim 26 wherein the water is present in a volume to facilitate transport though a wall of the microcapsule.

30. The method of claim 29 wherein the water is provided substantially by humidified gas.

31. The method of claim 26 wherein the microcapsules are in a chamber connected to a source of said gas stream containing the volatilized compound.

32. The method of claim 31 wherein the chamber is connected to a portable air stream pump.

33. The method of claim 31 wherein the chamber is connected to a waste air duct.

34. The method of claim 31 wherein the gas source is from a food processing operation.

35. The method of claim 31 wherein the gas source is a vessel containing a chemical dissolved in a low volatile oil.

36. The method of claim 31 wherein the gas source is a sample cell containing vegetable matter.

37. The method of claim 31 wherein the gas source is a fermentation broth.

38. The method of claim 26 wherein the gas stream is passed over the microcapsules for about 0.5–5 hours.

39. The method of claim 26 wherein the gas stream is at a flow rate of about 30 ml/min.

* * * * *